United States Patent
Hinchey et al.

(10) Patent No.: US 7,752,608 B1
(45) Date of Patent: Jul. 6, 2010

(54) SYSTEMS, METHODS AND APPARATUS FOR VERIFICATION OF KNOWLEDGE-BASED SYSTEMS

(75) Inventors: Michael G. Hinchey, Bowie, MD (US); James L. Rash, Davidsonville, MD (US); John D. Erickson, Midland, TX (US); Denis Gracinin, Blacksburg, VA (US); Christopher A. Rouff, Beltsville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1281 days.

(21) Appl. No.: 11/203,586

(22) Filed: Aug. 12, 2005

Related U.S. Application Data

(63) Continuation-in-part of application No. 10/789,028, filed on Feb. 25, 2004, now Pat. No. 7,543,274, application No. 11/203,586.

(60) Provisional application No. 60/603,519, filed on Aug. 13, 2004, provisional application No. 60/533,376, filed on Dec. 22, 2003.

(51) Int. Cl.
*G06F 9/45* (2006.01)
*G06F 9/44* (2006.01)
*G06F 17/00* (2006.01)
*G06N 5/04* (2006.01)
*G06N 5/02* (2006.01)

(52) U.S. Cl. .................. 717/136; 717/107; 717/146; 717/106; 717/117; 706/56; 706/60; 706/46; 706/47

(58) Field of Classification Search ............ None
See application file for complete search history.

(56) References Cited

U.S. PATENT DOCUMENTS

| | | | |
|---|---|---|---|
| 5,822,745 A | 10/1998 | Hekmatpour |
| 5,893,083 A | 4/1999 | Eshghi et al. |
| 5,899,985 A | 5/1999 | Tanaka |
| 6,314,415 B1 | 11/2001 | Mukherjee |
| 6,321,217 B1 | 11/2001 | Maeda et al. |
| 6,389,405 B1 | 5/2002 | Oatman et al. |
| 6,397,202 B1 | 5/2002 | Higgins et al. |
| 6,415,275 B1 | 7/2002 | Zahn |
| 6,484,155 B1 | 11/2002 | Kiss et al. |
| 6,490,574 B1 | 12/2002 | Bennett et al. |
| 6,502,084 B1 | 12/2002 | Boleyn et al. |

(Continued)

OTHER PUBLICATIONS

Author: Spreeuwenberg et al. Title: "VALENS: A Knowledge Based Tool to Validate and Verify an Aion Knowledge Base" Date: 2000 URL: http://nats-www.informatik.uni.hamburg.de/intern/proceedings/2002/ECAI/ecai2000/pdf/p0731.pdf.*

(Continued)

*Primary Examiner*—Lewis A Bullock, Jr.
*Assistant Examiner*—Joseph Kelly
(74) *Attorney, Agent, or Firm*—Heather Goo

(57) ABSTRACT

Systems, methods and apparatus are provided through which in some embodiments, domain knowledge is translated into a knowledge-based system. In some embodiments, a formal specification is derived from rules of a knowledge-based system, the formal specification is analyzed, and flaws in the formal specification are used to identify and correct errors in the domain knowledge, from which a knowledge-based system is translated.

31 Claims, 10 Drawing Sheets

U.S. PATENT DOCUMENTS

| | | |
|---|---|---|
| 6,513,024 B1 | 1/2003 | Li |
| 6,529,889 B1 | 3/2003 | Bromberg et al. |
| 6,529,954 B1 | 3/2003 | Cookmeyer, II et al. |
| 6,535,863 B1 | 3/2003 | O'Reilly |
| 6,535,864 B1 | 3/2003 | Zahn |
| 6,546,380 B1 | 4/2003 | Lautzenheiser et al. |
| 6,604,093 B1 | 8/2003 | Etzion et al. |
| 6,701,516 B1 | 3/2004 | Li |
| 6,760,717 B2 | 7/2004 | Suda et al. |
| 6,763,341 B2 | 7/2004 | Okude |
| 6,876,991 B1 | 4/2005 | Owen et al. |
| 2001/0051937 A1 | 12/2001 | Ross et al. |
| 2002/0052859 A1 | 5/2002 | Rosenfeld et al. |
| 2002/0100014 A1* | 7/2002 | Iborra et al. ............ 717/104 |
| 2003/0004912 A1 | 1/2003 | Pant et al. |
| 2003/0084015 A1 | 5/2003 | Beams et al. |
| 2003/0101152 A1 | 5/2003 | Hicks |
| 2003/0120620 A1 | 6/2003 | Fromherz et al. |
| 2003/0217023 A1 | 11/2003 | Cui et al. |
| 2004/0015463 A1 | 1/2004 | Herrera et al. |
| 2004/0039718 A1 | 2/2004 | Lumpp et al. |

OTHER PUBLICATIONS

Author: Harhalakis et al. Title: "Structured Representation of Rule-Based Specifications in CIM Using Updated Petri Nets" Date: Jan. 1995 URL: http://ieeexplore.ieee.org/stamp/stamp.jsp?arnumber=00362959.*

Author: Hähnle et al. Title: "An Authoring Tool for Informal and Formal Requirements Specifications" Date: 2002 URL: http://www.springerlink.com/content/9b5wu2v0ea0lnyrb/fulltext.pdf.*

Author: Shi et al. Title: "Combining Methods for the Analysis of a Fault-Tolerant System" Date: 1999 URL: http://ieeexplore.ieee.org/stamp/stamp.jsp?arnumber=00816222.*

Author: Bose et al. Title: "Knowledge-based approach to domain modeling: organizational process modeling application" Date: 1996 URL: http://www.sciencedirect.com/science?_ob=ArticleURL&_udi=B6WKB-45NJR2S6&_user=2502287&_rdoc=1&_fmt=&_orig=search&_sort=d&view=c&_acct=C000055109&_version=1&_urlVersion=0&_userid=2502287&md5=81568a0e27d3b79a296248.*

Author: Lee et al. Title: "Automated conversion from requirements documentation to an object-oriented formal specification language" Date: 2002 URL: http://portal.acm.org/ft_gateway.cfm?id=508972&type=pdf&coll=GUIDE&dl=GUIDE&CFID=41441850&CFTOKEN=31432243.*

Author: Ledang et al. Title: "Integrating UML and B Specification Techniques" Date: Sep. 6, 2001 URL: http://www.loria.fr/~souquier/publications/informatik01.pdf.*

Author: Bozga et al. Title: "Automated validation of distributed software using the IF environment" Date: Oct. 8-10, 2001 URL: http://ieeexplore.ieee.org/stamp/stamp.jsp?arnumber=00962542.*

Author: Roman et al. Title: "Formal Derivation of Rule-Based Programs" Date: 1993 URL: http://ieeexplore.ieee.org/stamp/stamp.jsp?tp=&arnumber=221138&isnumber=5778.*

Author: Moulding Title: "Combining formal specification and CORE: an experimental investigation" Date: Mar. 1995 URL: http://ieeexplore.ieee.org/stamp/stamp.jsp?tp=&arnumber=373906&isnumber=8550.*

* cited by examiner

SYSTEMS, METHODS AND APPARATUS FOR VERIFICATION OF KNOWLEDGE-BASED SYSTEMS

RELATED APPLICATIONS

This application claims the benefit of U.S. Provisional Application Ser. No. 60/603,519 filed Aug. 13, 2004 under 35 U.S.C. 119(e).

This application is a continuation-in-part of U.S. application Ser. No. 10/789,028 filed Feb. 25, 2004 now U.S. Pat. No. 7,543,274 entitled "System and Method for Deriving a Process-Based Specification," which claims the benefit of U.S. Provisional Application Ser. No. 60/533,376 filed Dec. 22, 2003.

ORIGIN OF THE INVENTION

The invention described herein was made by a employees of the United States Government and may be manufactured and used by or for the Government of the United States of America for governmental purposes without the payment of any royalties thereon or therefor.

FIELD OF THE INVENTION

This invention relates generally to software development processes and more particularly to validating a system implemented from domain knowledge.

BACKGROUND OF THE INVENTION

High dependability and reliability is a goal of all computer and software systems. Complex systems, such as knowledge-based systems and expert systems, in general cannot attain high dependability without addressing crucial remaining open issues of software dependability. The need for ultrahigh dependable systems increases continually, along with a corresponding increasing need to ensure correctness in system development. Correctness exists where the implemented system is equivalent to the requirements, and where this equivalence can be mathematically proven.

Knowledge-based systems and expert systems are examples of a general class of inferencing systems that comprise an inference engine and separate knowledge and rule bases. The inference engine itself does not include domain knowledge, but the knowledge and rule bases are specific to the domain and are used by the inference engine, and the combination of these elements implements a knowledge-based system application. Further, during the operation of a particular knowledge-based system (i.e., application), the firing of rules by the inference engine may dynamically modify the knowledge base (which contains the essential application facts or data), and the resulting changes determine the subsequent course of execution of the running application. It is possible, though not typical, that the running application will modify its own rule base, and some such systems could be classified as "learning" systems.

Knowledge-based systems, expert systems and inferencing systems in general are each referred to as a KBS herein.

The development of a KBS begins with the development of a requirements specification, such as a formal specification or an informal specification that represents domain knowledge. A formal specification might be encoded in a high-level language such as Prolog, whereas domain knowledge in the form of an informal specification can be expressed in restricted natural language, "if-then" rules, graphical notations, English language, programming language representations, flowcharts, scenarios or even using semi-formal notations such as unified modeling language (UML) use cases.

A scenario may be defined as a natural language text (or a combination of any, e.g. graphical, representations of sequential steps or events) that describes the software's actions in response to incoming data and the internal goals of the software. Some scenarios may also describe communication protocols between systems and between the components within the systems. Also, some scenarios may be known as UML use-cases. Preferably, a scenario describes one or more potential executions of a system, describing what happens in a particular situation, and what range of behaviors is expected from or omitted by the system under various conditions.

Natural language scenarios are usually constructed in terms of individual scenarios written in a structured natural language. Different scenarios may be written by different stakeholders of the system, corresponding to the different views they have of how the system will perform, including alternative views corresponding to higher or lower levels of abstraction. Natural language scenarios may be generated by a user with or without mechanical or computer aid. The set of natural language scenarios provides the descriptions of actions that occur as the software executes. Some of these actions will be explicit and required, while others may be due to errors arising, or as a result of adapting to changing conditions as the system executes.

For example, if the system involves commanding space satellites, scenarios for that system may include sending commands to the satellites and processing data received in response to the commands. Natural language scenarios might be specific to the technology or application domain to which they are applied. A fully automated general purpose approach covering all domains is technically prohibitive to implement in a way that is both complete and consistent. To ensure consistency, the domain of application might be specific-purpose. For example, scenarios for satellite systems may not be applicable as scenarios for systems that manufacture agricultural chemicals.

After completion of an informal specification that represents domain knowledge, the KBS is developed. A formal specification is not necessarily used in the development of a KBS.

In the development of some KBS's, computer readable code is generated. The generated code is encoded in a computer language, such as a high-level computer language. Examples of the languages include Java Expert System Shell (JESS®), C Language Integrated Production System (CLIPS) and Prolog. One example of such a KBS is the Reduced Operations by Optimizing Tasks and Technology (ROBOTT) system. ROBOTT is a system which performs performance and safety monitoring on the POLAR and X-Ray Timing Explorer (XTE) satellites. ROBOTT is a KBS with rules expressed in CLIPS.

One step in creating a KBS with high dependability and reliability is verification and validation that the executable KBS accurately reflects the requirements. Validation of the generated code is sometimes performed through the use of a domain simulator, a very elaborate and costly approach that is computationally intensive. This process of validation rarely results in an unambiguous result and rarely results in uncontested results among systems analysts. In some examples, a KBS is validated through parallel mode, shadow mode operations with a human operated system. This approach can be very expensive and exhibit severely limited effectiveness. In some complex systems, this approach leaves vast parts of possible execution paths forever unexplored and unverified.

During the life cycle of a system, requirements typically evolve. Manual change to the system creates a risk of introducing new errors and necessitates retesting and revalidation, which can greatly increase the cost of the system. Often, needed changes are not made due to the cost of verifying/validating consequential changes in the rest of the system. Sometimes, changes are simply made in the code and not reflected in the specification or design, due to the cost or due to the fact that those who generated the original specification or design are no longer available.

For the reasons stated above, and for other reasons stated below which will become apparent to those skilled in the art upon reading and understanding the present specification, there is a need in the art for an automated, generally applicable way to verify that an implemented system is a provably correct implementation of domain knowledge. There is also a need for a process for requirements validation that does not require large computational facilities.

BRIEF DESCRIPTION OF THE INVENTION

The above-mentioned shortcomings, disadvantages and problems are addressed herein, which will be understood by reading and studying the following specification.

The systems, methods and apparatus described herein provide an automated, generally applicable means to validate a KBS implementation of domain knowledge. The fundamental inadequacy of all currently available automated development approaches—the lack of ways to establish a provable equivalence between the informal requirements and the implemented KBS—is solved.

In one aspect, systems, methods and apparatus are provided through which rules are translated without human intervention into a formal specification. In some embodiments the formal specification is a process-based specification. In some embodiments, the formal specification is analyzed for errors. In some embodiments, the formal specification is translated into domain knowledge.

In another aspect, a system includes an inference engine and a translator, the translator being operable to receive rules and to generate in reference to an inference engine, a formal specification such as a formal specification encoded in Communicating Sequential Processes language (CSP). The system also includes an analyzer operable to perform model verification/checking and determine existence of omissions, deadlock, livelock, and race conditions or other problems and inconsistencies in the formal specification.

In yet another aspect, a method includes translating domain knowledge to a formal specification, and analyzing this formal specification.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, an embodiment of a system level overview is described. In the second section, embodiments of methods are described. In the third section, an embodiment of the hardware and the operating environment in conjunction with which embodiments may be practiced is described. In the fourth section, particular implementations of embodiments are described. Finally, in the fifth section, a conclusion of the detailed description is provided.

System Level Overview

Figure 1:
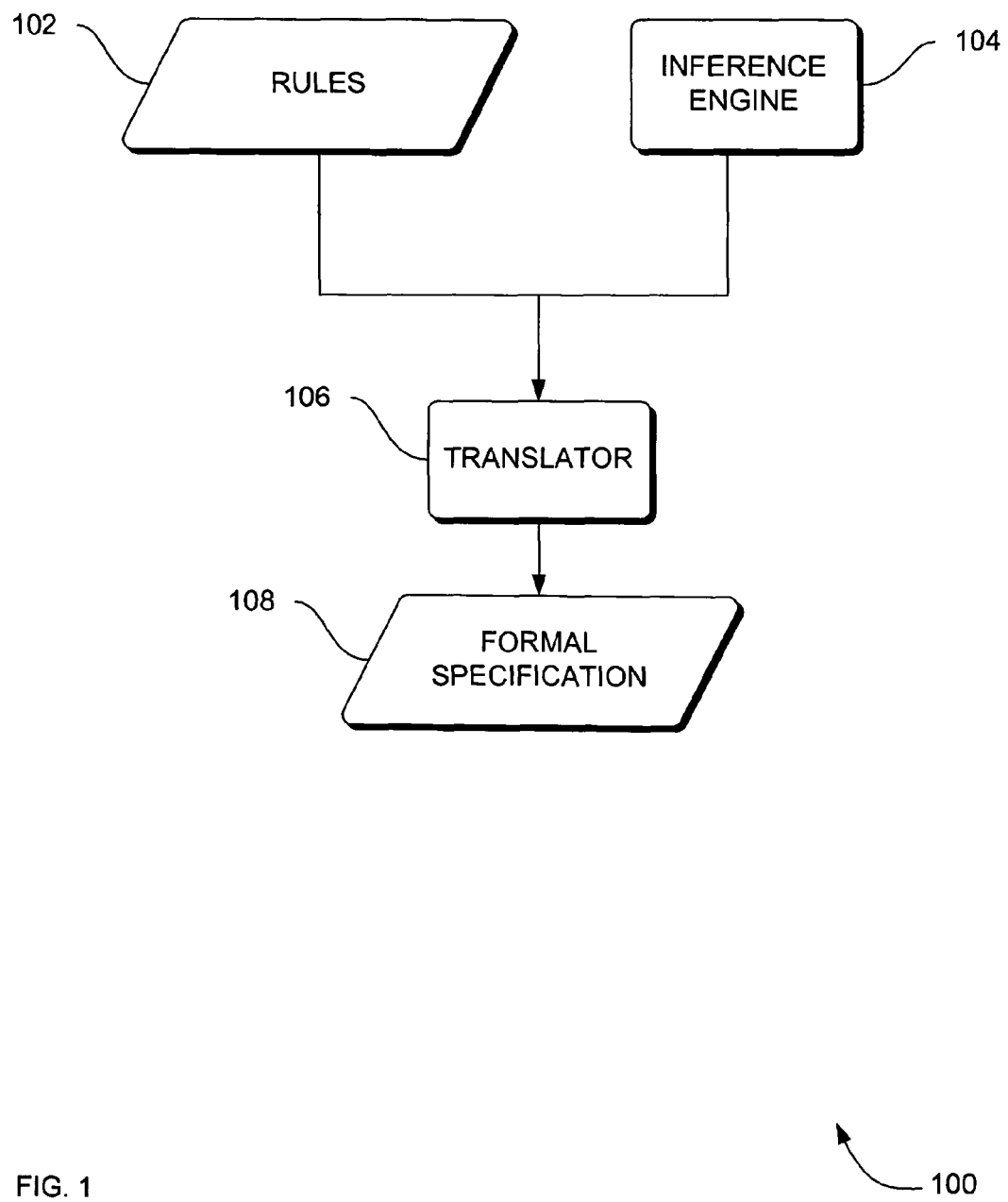
FIG. 1 is a block diagram that provides an overview of a system to reverse-engineer a formal specification from rules of a knowledge-based system, according to an embodiment of the invention.

This overview section includes a description of one embodiment of a preferred system, shown in FIG. 1, that can generate a formal specification from rules of a knowledge-based system.

FIG. 1 illustrates a block diagram that provides an overview of one embodiment of a system to reverse-engineer a formal specification from rules of a knowledge-based system (KBS). System 100 may alleviate a need in the art for an automated, generally applicable way to verify that an implemented KBS system is a provably correct implementation of a formal specification.

One embodiment of the system 100 is a software development system that includes a data flow and processing points for the data. According to the disclosed embodiments, system 100 can convert rules into a formal specification on which model checking and other mathematics-based verifications can then be performed.

The preferred system 100 may include a plurality of rules 102. The rules 102 can be written in a particular syntax, such as a language or a grammar used by an inference engine 104, or in logic rules encoded in a computer language, such as a high-level computer language (e.g. Prolog or JESS). The preferred rules 102 may embody software applications such as rule-based, knowledge-based or expert systems, although one skilled in the art will recognize that other systems fall within the purview of this invention.

In one embodiment, the rules 102 are received by a translator 106. An inference engine 104 might be referenced by the translator 106 when the rules 102 are translated by the translator 106 into a formal specification 108 or other formal specification language representation. In some embodiments no manual intervention in the translation is provided. Further, in some embodiments the formal specification 108 may be encoded in an intermediate notation or language of sequential process algebra such as Hoare's language of Communicating Sequential Processes (CSP) or Calculus of Communicating Systems (CCS) or variants of these languages. Those skilled in the art will readily understand that other appropriate notations and/or languages exist that are within the scope of this invention.

In some embodiments, the formal specification 108 may be mathematically and provably equivalent to the rules 102. Mathematically equivalent does not necessarily mean mathematically equal. Mathematical equivalence of A and B means that A implies B and B implies A. Note that the preferred formal specification 108 of some embodiments is mathematically equivalent to, rather than necessarily equal to, the rules 102.

In some embodiments, the system 100 rules 102 may specify allowed situations, events and/or results of a software system. In that sense, the rules 102 can provide a very abstract specification of the software system.

Figure 9:
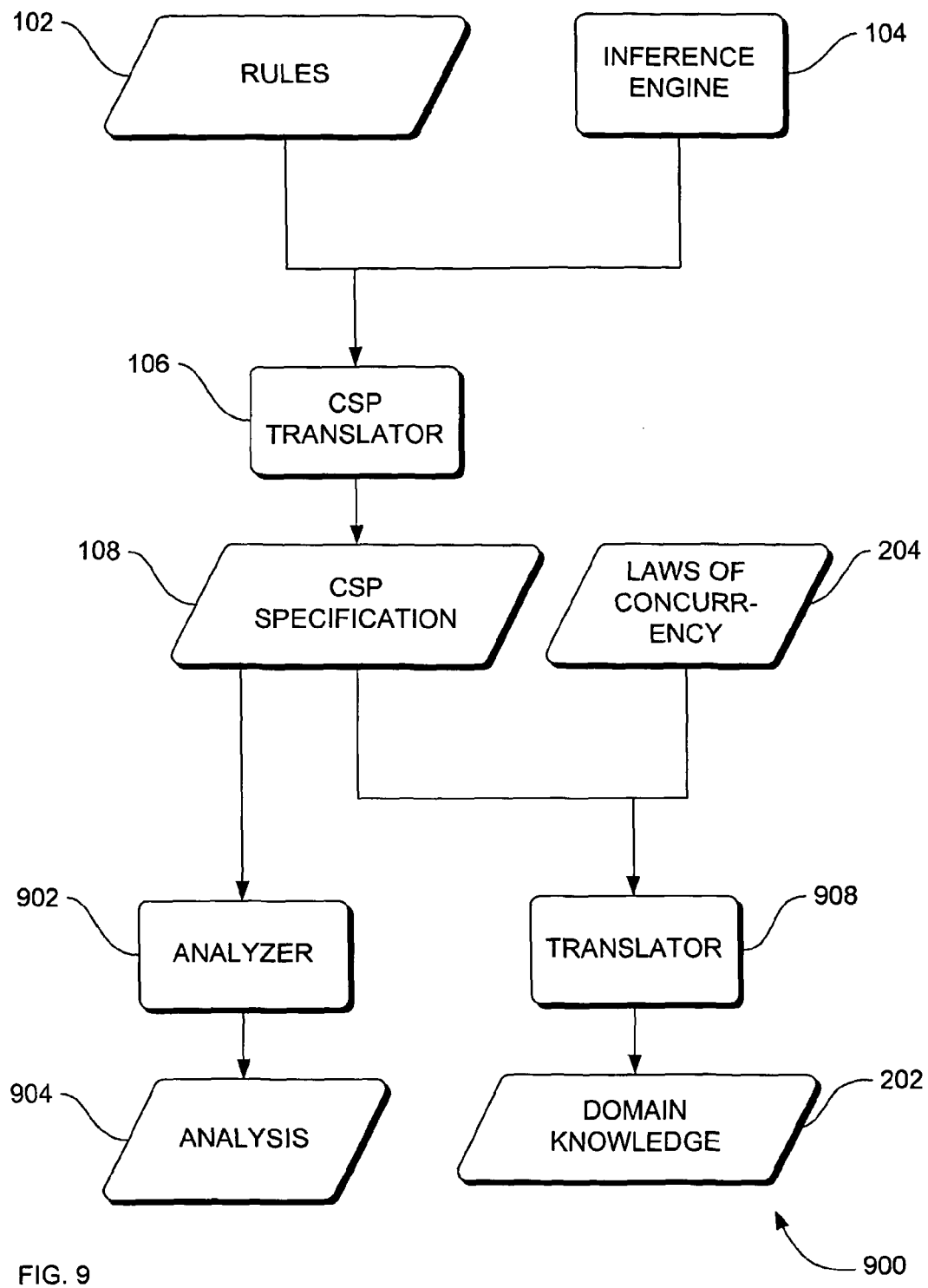
FIG. 9 is a block diagram of a particular CSP implementation of an apparatus to analyze a CSP specification generated from rules and/or generate domain knowledge from the rules, according to an embodiment.

A specific embodiment of system 100 that provides for analysis of the formal specification 108 and generation of domain knowledge from the formal specification 108 is described in FIG. 9.

Some embodiments of system 100 may be operational for a wide variety of rules, computer instructions, computer languages and applications; thus, system 100 can be generally applicable. Such applications may include, without limitation, space satellite command systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed may fall within the scope of this invention.

Some embodiments of the system 100 may provide mechanical or automatic generation of the formal specification 108, in which human intervention is not required. In at least one embodiment of the system 100, all that is required to update the generated application is a change in the rules 102, in which case the changes and validation will ripple through the entire system without human intervention when system 100 operates. This also allows the possibility of cost effectively developing competing designs for a product and implementing each to determine the best one.

Perhaps most notably, some embodiments of the system 100 do not include an automated logic engine, such as a theorem prover or an automated deduction engine, to infer the formal specification 108 from the rules 102. However, the formal specification 108 can be a provably correct version of the rules 102.

Figure 8:
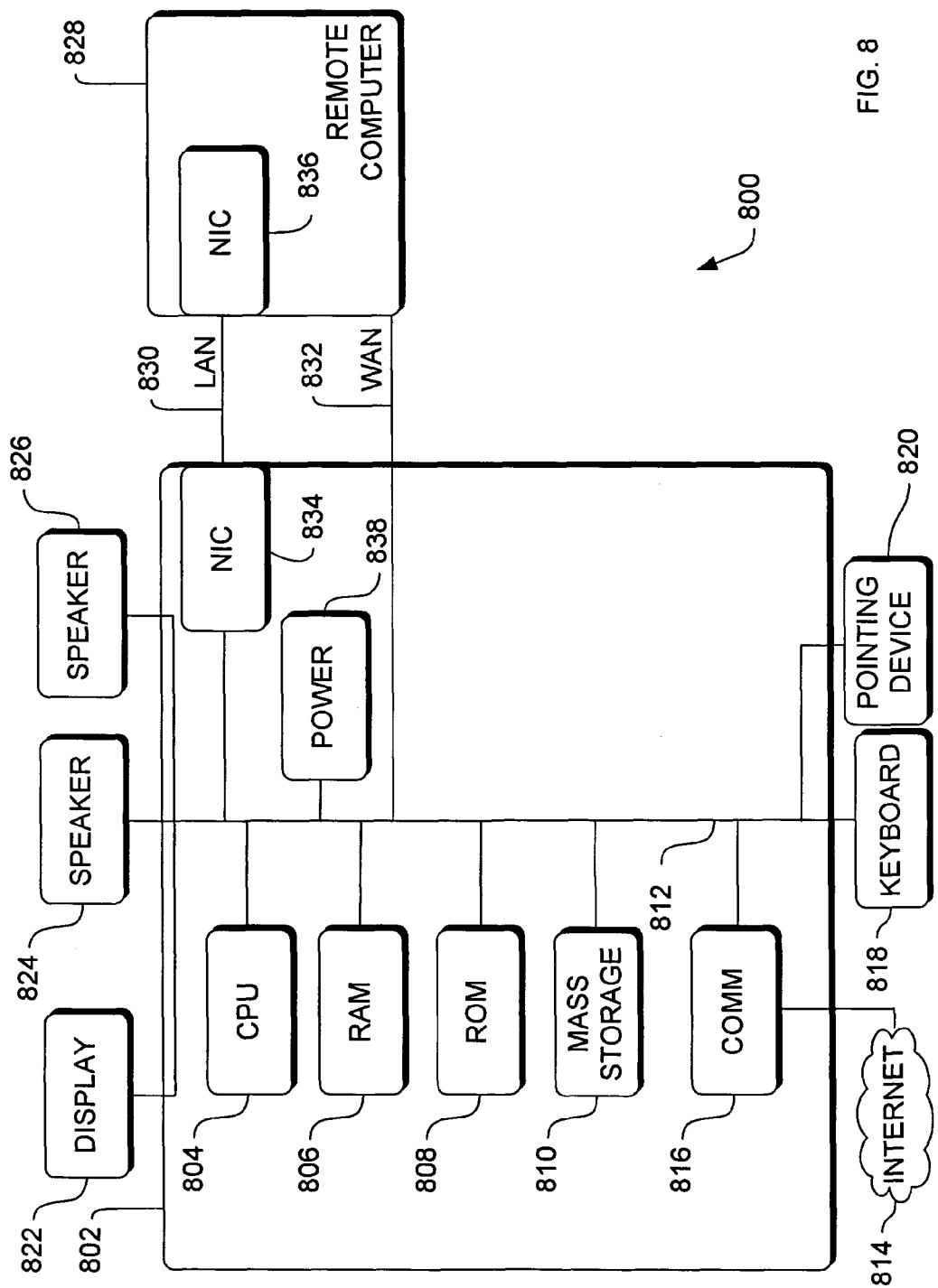
FIG. 8 is a block diagram of a hardware and operating environment in which different embodiments can be practiced, according to an embodiment.

Some embodiments of system 100 operate in a multi-processing, multi-threaded operating environment on a computer, such as the computer 802 illustrated in FIG. 8. While the system 100 is not limited to any particular rules 102, inference engine 104, translator 106 and formal specification 108, for sake of clarity, embodiments of simplified rules 102, inference engine 104, translator 106 and formal specification 108 are described.

Figure 2:
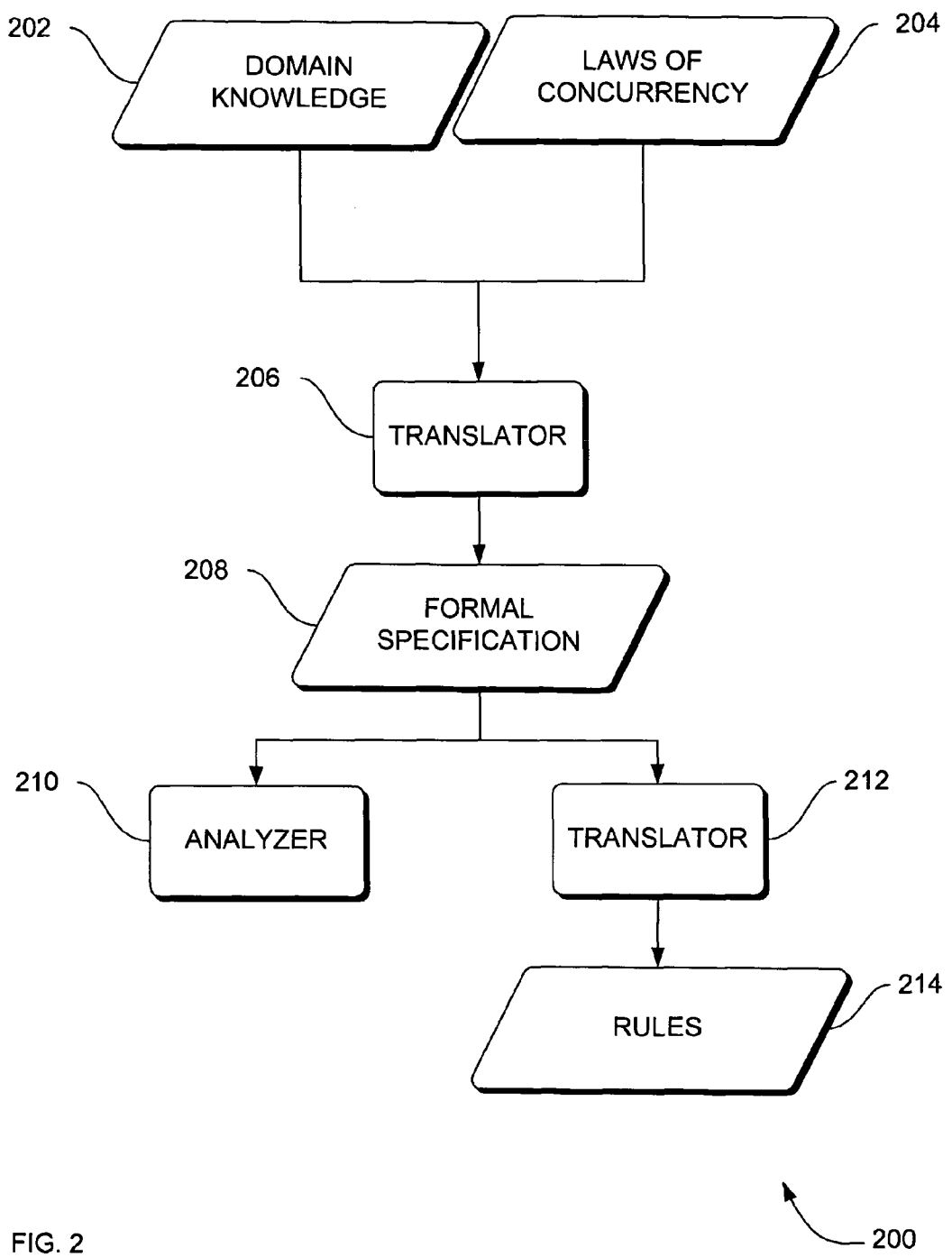
FIG. 2 is a block diagram that provides an overview of a system to generate a knowledge-based system from domain knowledge, according to an embodiment.

FIG. 2 is a block diagram that provides an overview of one preferred system to generate a knowledge-based system from domain knowledge. System 200 may solve a need in the art for an automated, generally applicable approach to producing a knowledge-based system that may be a provably correct implementation of an informal design specification that does not require, in applying the system to any particular problem or application, the use of an automated logic engine.

In some embodiments, the system 200 is a software development system that may include a data flow and processing points for the data. System 200 may be representative of (i) computer applications and electrical engineering applications such as chip design and other electrical circuit design (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications may exist that are within the purview of this invention. According to the disclosed embodiments, system 200 can, without human intervention, convert different types of specifications (such as natural language scenarios or descriptions which are effectively pre-processed scenarios) into process-based formal specifications on which model checking and other mathematics-based verifications are performed, and then optionally convert the formal specification into code.

At least one embodiment of the system 200 may include domain knowledge 202, which has a plurality of rules or requirements. The domain knowledge can be expressed in restricted natural language, graphical notations, English language, programming language representations, scenarios or even using semi-formal notations such as unified modeling language (UML) use cases. Of course, one skilled in the art will notice that other languages, notations, representations or scenarios may be used that fit within the scope of this invention.

According to some embodiments, a scenario is natural language text (or a combination of any, such as possibly graphical, representations of sequential steps or events) that describes the software's actions in response to incoming data and the internal goals of the software. Scenarios also may describe communication protocols between systems and between the components within the systems. Scenarios also may be known as use cases. A scenario can describe one or more potential executions of a system, such as describing what happens in a particular situation and what range of behaviors is expected from or omitted by the system under various conditions.

Natural language scenarios may be constructed in terms of individual scenarios written in a structured natural language. Different scenarios may be written by different stakeholders of the system, corresponding to the different views they may have of how the system will perform, including alternative views corresponding to higher or lower levels of abstraction. Natural language scenarios may be generated by a user with or without mechanical or computer aid. Such a set of natural language scenarios may provide the descriptions of actions that occur as the software executes. Some of these actions may be explicit and required, while others may be due to errors arising or as a result of adapting to changing conditions as the system executes.

For example, if the system involves commanding space satellites, scenarios for that system may include sending commands to the satellites and processing data received in response to the commands. Natural language scenarios should be specific to the technology or application domain to which they are applied. A fully automated general purpose approach covering all domains is technically prohibitive to implement in a way that is both complete and consistent. To ensure consistency, the domain of application are preferably purpose-specific. For example, scenarios for satellite systems may not be applicable as scenarios for systems that manufacture agricultural chemicals.

One or more embodiments of the system 200 may also include a set of laws of concurrency 204. Laws of concurrency 204 are rules detailing equivalences between sets of processes combined in various ways, and/or relating process-based descriptions of systems or system components to equivalent sets of traces. Laws of concurrency 204 may be expressed in any suitable language for describing concurrency. These languages include but are not limited to, CSP and CCS and variants of these languages. Those skilled in the art will understand that many suitable languages in addition to those listed may fall within the scope of this invention.

In some embodiments, the domain knowledge 202 and a set of laws of concurrency 204 may be received by a translator 206. The plurality of rules or requirements of the domain knowledge 202 can be translated without human intervention into a formal specification 208. In some embodiments, the formal specification 208 may be an intermediate notation or language of sequential process algebra such as Hoare's language of Communicating Sequential Processes (CSP), although one skilled in the art will recognize that other notations or languages may be used.

One or more embodiments may specify that the formal specification 208 is mathematically and provably equivalent to the domain knowledge 202. Mathematically equivalent does not necessarily mean mathematically equal. As indicated, mathematical equivalence of A and B means that A implies B and B implies A. Note that applying the laws of concurrency 204 to the formal specification 208 would allow for the retrieval of a trace-based specification that is equivalent to the domain knowledge 202. Further note that, in at least one embodiment, the formal specification 208 is mathematically equivalent to rather than necessarily equal to the domain knowledge 202. This aspect indicates the process may be reversed, allowing for reverse engineering of existing systems, or for iterative development of more complex systems.

In some embodiments, the system may include an analyzer 210 to determine various properties, such as the existence of omissions, deadlock, livelock, and race conditions, as well as other conditions, in the formal specification 208, although one skilled in the art will recognize that other additional properties may be determined by the analyzer 210.

System 200 may also include a code translator 212 to translate the plurality of formal specification 208 to a set of rules in a high-level computer language 214, such as an expert system shell language or similar. One example of an expert system shell language is the CLIPS language, although other languages may be used as well. In some embodiments, the formal specification 208 comprises a plurality of formal specification segments, such as process-based specification segments or the like.

System 200 may be operational for a wide variety of domain knowledge languages and applications, thus system 200 is generally applicable. Such applications include, without limitation, distributed software systems, sensor networks, robot operation, complex scripts for spacecraft integration and testing, chemical plant operation and control, and autonomous systems. One skilled in the art will understand that these applications are cited by way of example and that other applications may fall within the scope of the invention.

Furthermore, the system 200 may provide regeneration of the executable system when requirements dictate a change in the high level specification. In some embodiments of the system 200, all that is required to update the generated application may be a change in the domain knowledge 202, and then the changes and validation can ripple through in a process when system 200 operates. This also allows the possibility of cost effectively developing competing designs for a product and implementing each to determine the best one.

Most notably, some embodiments of the system 200 do not include an automated logic engine, such as a theorem prover to infer the formal specification 208 from the domain knowledge 202. However, the formal specification 208 can be a provably correct implementation of the domain knowledge 202, provided the developer of an instance of system 200 has properly used an automated logic engine (not shown) to prove that the translator 206 correctly translates domain knowledge into formal specifications.

Some embodiments of system 200 operate in a multi-processing, multi-threaded operating environment on a computer, such as the computer 802 illustrated in FIG. 8. While the system 200 is not limited to any particular domain knowledge 202, plurality of rules or requirements, set of laws of concurrency 204, translator 206, formal specification 208, analyzer 210, code translator 212 and rules 214, for sake of clarity a simplified domain knowledge 202, plurality of rules or requirements, set of laws of concurrency 204, direct mechanical translator 206, formal specification 208, analyzer 210, code translator 212, and rules 214 are described by way of example.

Method Embodiments

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, embodiments of the methods performed by the server computer programs, firmware, or hardware may also be composed of computer-executable instructions. Methods 300-700 can be performed by a program executing on, or performed by firmware or hardware that is a part of, a computer, such as computer 802 in FIG. 8.

Figure 3:
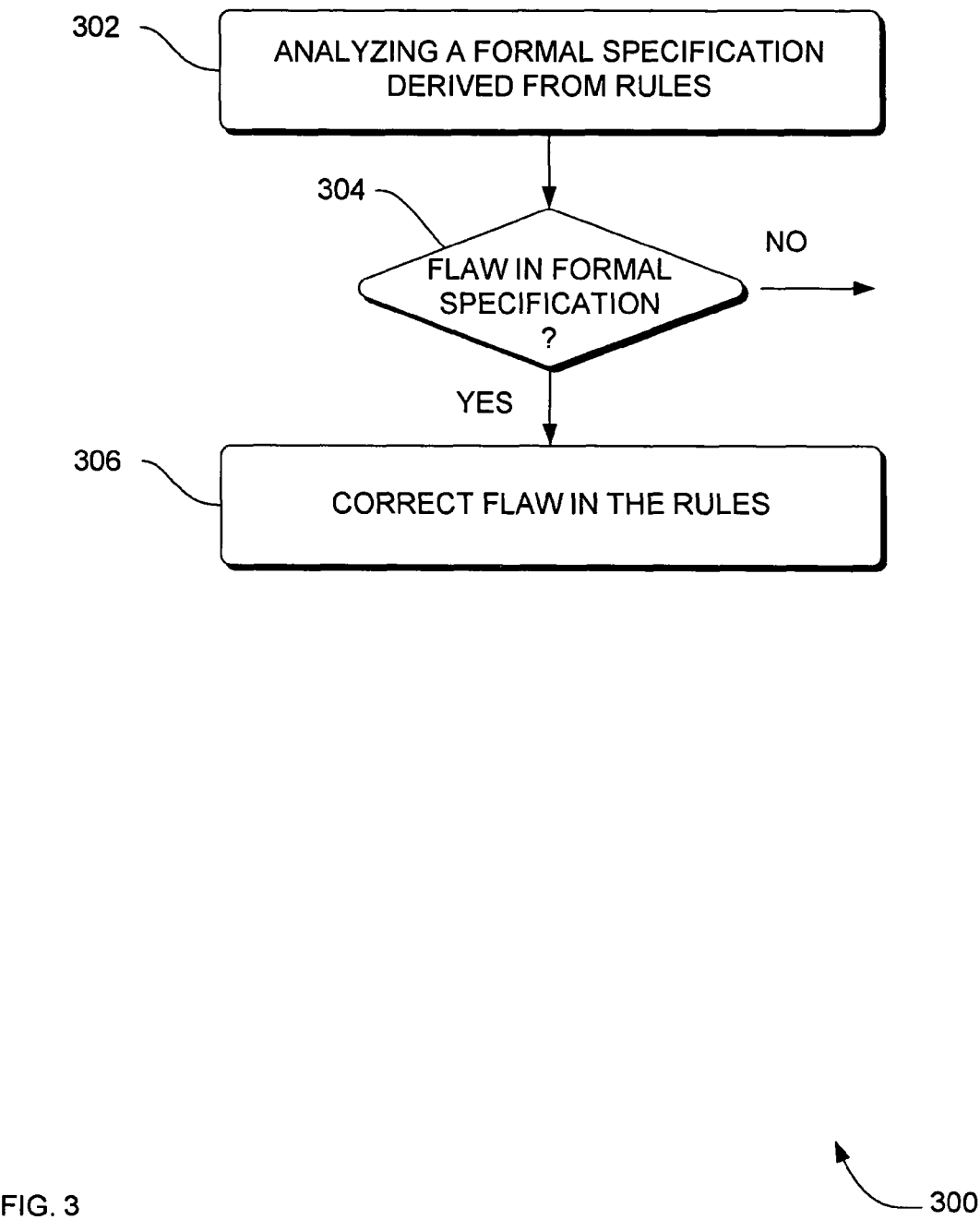
FIG. 3 is a flowchart of a method to validate/update rules of a knowledge-based system, according to an embodiment.

FIG. 3 is a flowchart of a method 300 to validate/update a knowledge-based system, according to an embodiment.

Method 300 may include analyzing 302 a formal specification, such as 108, of the knowledge-based system, the formal specification having been previously derived from the rules, such as 102, of the knowledge-based system.

Thereafter, a determination 304 may be made as to whether or not the analyzing 302 indicates that the formal specification contains a flaw. If a flaw does exist, then the rules, such as 102, can be corrected 306 accordingly.

In some embodiments, the analyzing 302 may include applying mathematical logic to the formal specification in order to identify a presence or absence of mathematical properties of the formal specification. Mathematical properties of the formal specification that can be determined by applying mathematical logic to the formal specification may include, by way of example:

1) whether or not the formal specification implies a system execution trace that includes a deadlock condition.

2) whether or not the formal specification implies a system execution trace that includes a livelock condition.

The above two properties are domain independent. One skilled in the art will note that there are many other possible flaws that could be detected through the analysis of the model, many or even most of which might be domain dependent. An example of a domain dependent property would be represented by the operational principle that "closing a door that is not open is not a valid action." This example would be applicable in the domain of the Hubble Space Telescope on-orbit repair.

Figure 5:
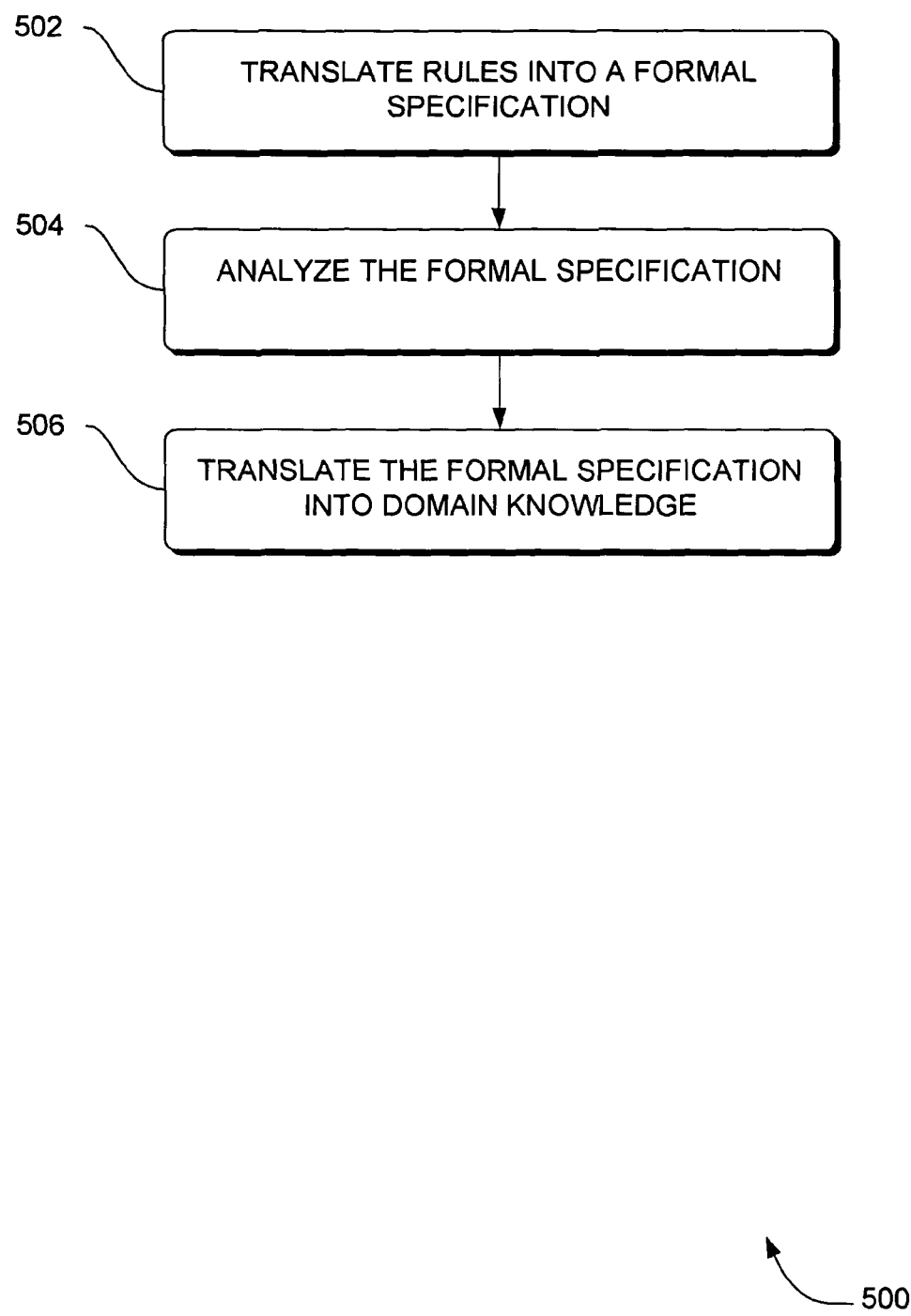
FIG. 5 is a flowchart of a method to generate a formal specification from rules, according to an embodiment.

Because in some embodiments the formal specification may be provably equivalent to the rules by virtue of method 300, if a flaw is detected in the formal specification, then the flaw could be corrected by changing (correcting) the rules. Once the correction is made, then the corrected rules may be processed by system 100 in FIG. 1 or method 500 in FIG. 5 to derive a new formal specification from the corrected rules. According to at least one embodiment, the new formal specification can be processed by method 300, and the iterations of method 500 and method 300 can repeat until there are no more flaws in the formal specification generated from the rules, at which point the rules have no flaws because the formal specification is provably equivalent to the rules from which it was derived. Thus, iterations of methods 500 and 300 can provide verification/validation of the rules.

Thereafter, the new formal specification can be used to generate an implementation of the system.

Figure 4:
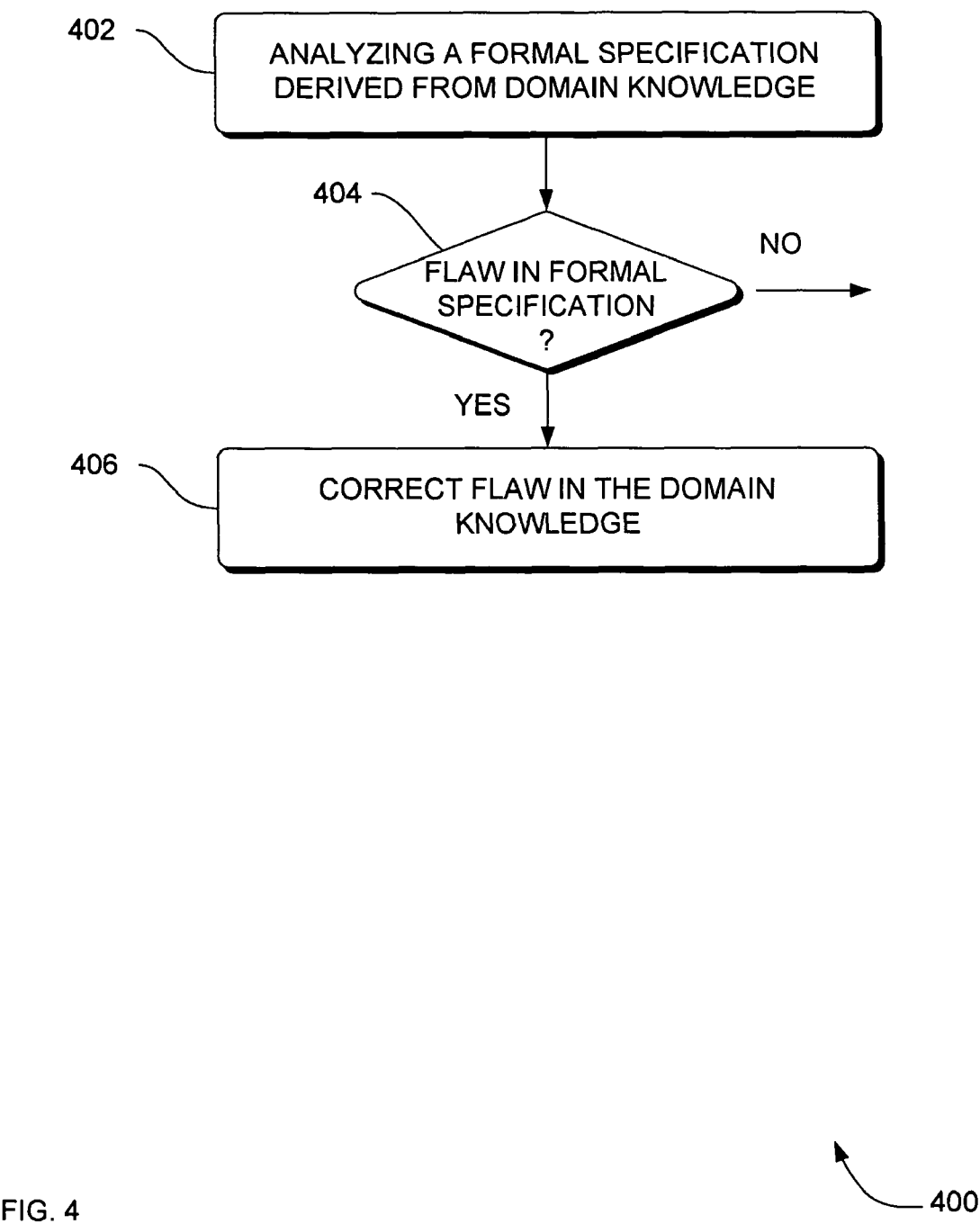
FIG. 4 is a flowchart of a method to validate/update domain knowledge, according to an embodiment.

FIG. 4 is a flowchart of a method 400 to validate/update domain knowledge, according to an embodiment.

In some embodiments, the method 400 includes analyzing 402 a formal specification, such as 108, the formal specification preferably having been previously derived from the domain knowledge, such as domain knowledge 202.

Thereafter, a determination 404 may be made as to whether or not the analyzing 402 indicates that the formal specification contains a flaw. If a flaw does exist, then the domain knowledge, such as 202, may be corrected 406 accordingly.

In some embodiments, the analyzing 402 may include applying mathematical logic to the formal specification in order to identify a presence or absence of mathematical properties of the formal specification.

Because the formal specification can be provably equivalent to the domain knowledge by virtue of method 400, if a flaw is detected in the formal specification, then the flaw could be corrected by changing (correcting) the domain knowledge. Once the correction is made, then the corrected rules may be processed by system 200 in FIG. 2 or method 600 in FIG. 6 to derive a new formal specification from the corrected domain knowledge. The new formal specification can be processed by method 400, and the iterations of method 600 and method 400 can repeat until there are no more flaws in the formal specification generated from the domain knowledge, at which point the domain knowledge has no flaws because the formal specification can be provably equivalent to the domain knowledge from which it was derived. Thus, iterations of methods 600 and 400 provide verification/validation of the domain knowledge.

In some embodiments, the formal specification 108 may be a process-based specification, such as process algebra encoded notation. The process algebra encoded notation is a mathematically notated form. This embodiment may satisfy the need in the art for an automated, mathematics-based process for requirements validation that does not require large computational facilities.

The method 500 may include translating 502 rules 102 into a formal specification 108 without human intervention.

Thereafter, method 500 may include optionally analyzing 504 the formal specification model. The analyzing 504 may be a verification/validation of the rules 102. In some embodiments, the analyzing 504 determines various properties such as existence of omissions, deadlock, livelock, and race conditions in the formal specification 108, although one skilled in the art will know that analyzing the formal specification model may determine other properties not specifically listed, which are contemplated by this invention. In some embodiments, the analyzing 504 may provide a mathematically sound analysis of the rules 102 in a general format that doesn't require significant understanding of the specific rules of the rules 102. Further, the analyzing 504 can warn developers of errors in their rules 102, such as contradictions and inconsistencies, but equally importantly it can highlight rules or sets of rules that are underspecified or over-specified and need to be corrected for the rules 102 to operate as intended. Thus, no knowledge of the rules 102 is required, but instead significant analysis, verification, testing, simulation and model checking of the rules 102 using customized tools or existing tools and techniques is provided.

Thereafter, in some embodiments, method 500 may include translating 506 the formal specification 108 to domain knowledge. Thus, in at least one embodiment, the method 500 provides a method to convert rules to domain knowledge without involvement from a computer programmer.

Most notably, some embodiments of the method 500 do not include invoking an automated logic engine, such as a theorem prover, to infer the formal specification 108 from the rules 102.

Figure 6:
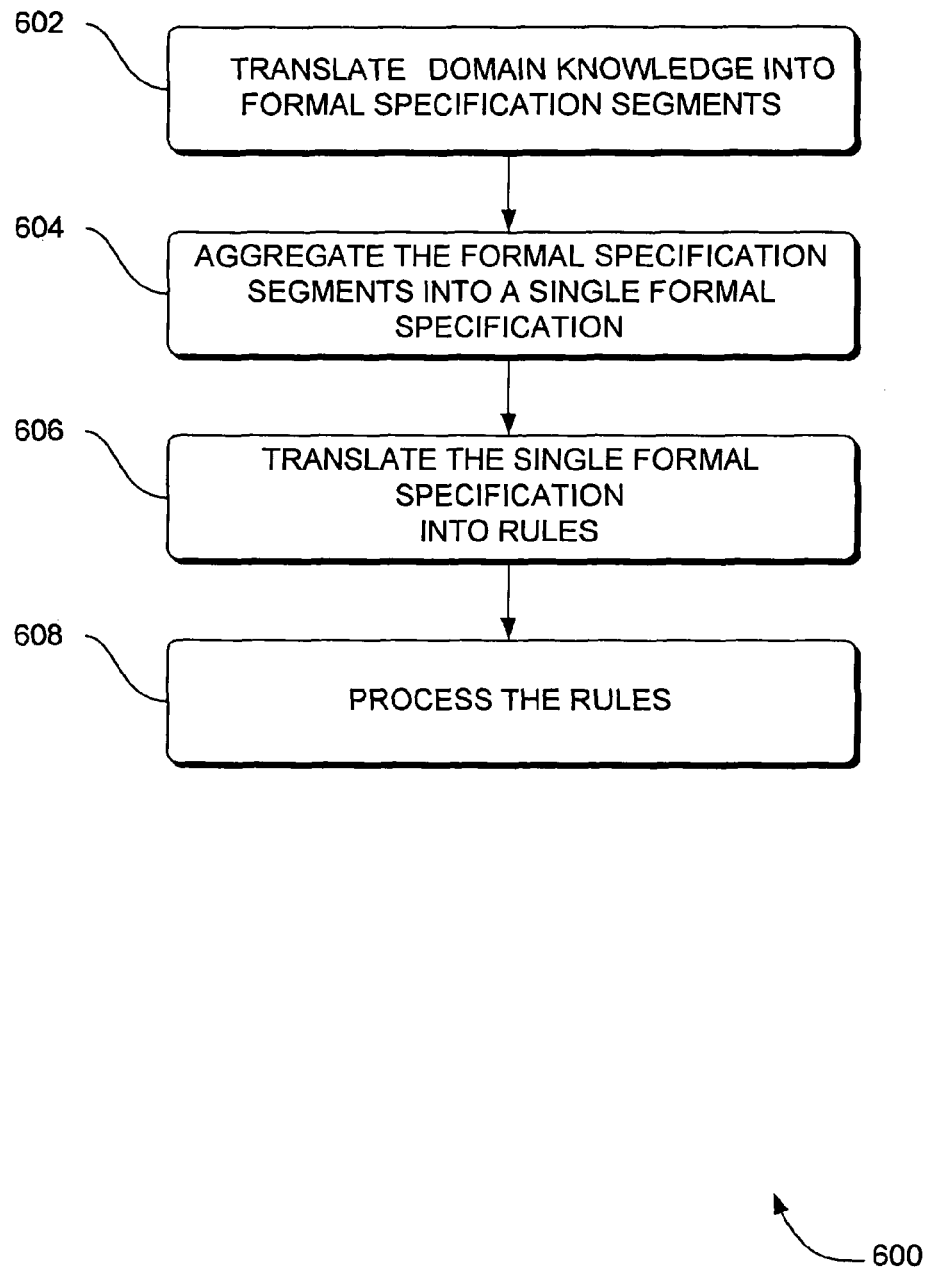
FIG. 6 is a flowchart of a method to generate a knowledge-based system from domain knowledge, according to an embodiment.

FIG. 6 is a flowchart of a method 600 to generate rules of a knowledge-based system from domain knowledge, according to an embodiment. Method 600 may solve the need in the art to generate rules from requirements with neither the time involved in manually writing the rules, nor the mistakes that may arise in manually writing the rules, without using an automated logic engine.

Figure 7:
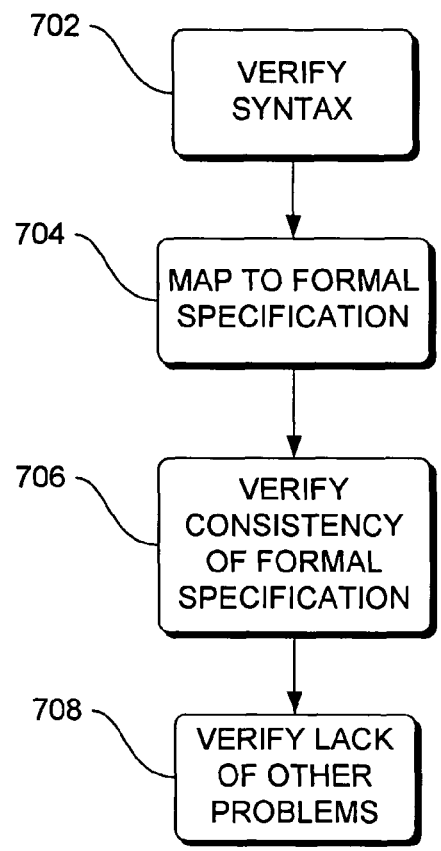
FIG. 7 is a flowchart of a method to translate each of a plurality of requirements of the domain knowledge to a plurality of formal specification segments, according to an embodiment.

Method 600 may include translating 602 each of a plurality of requirements of the domain knowledge to a plurality of formal specification segments. The translation may be done without human intervention. In some embodiments, the translating 602 includes inferring the formal specification segments from the domain knowledge. One embodiment of translating 602 is shown in FIG. 7 below.

In some embodiments, the formal specification is process algebra notation. Those embodiments may satisfy the need in the art for an automated, mathematics-based process for requirements validation that does not require large computational facilities.

Thereafter, method 600 may include aggregating 604 the plurality of formal specification segments into a single formal specification model.

Subsequently, method 600 may include translating 606 the single formal specification model to rules 102 encoded in the CLIPs computer language or Prolog or some other high-level computer programming language known to those skilled in the art. Thereafter, method 600 may include processing 608 the rules 102 encoded, for instance, in the CLIPs computer language by an inference engine, such as inference engine 104. Thus, method 600 provides an embodiment of a method to convert domain knowledge to an application system without involvement from a computer programmer.

Most notably, method 600 does not include invoking a theorem prover or any other automated logic engine to infer the formal specification segments from the domain knowledge.

FIG. 7 is a flowchart of a method 700 to translate each of a plurality of requirements of the domain knowledge to a plurality of formal specification segments, according to an embodiment. Method 700 is one embodiment of translating 602 in FIG. 6. As indicated, such translation may be accomplished without human intervention.

In some embodiments, the method 700 may include verifying 702 the syntax of the plurality of requirements of the domain knowledge. Thereafter, method 700 may include mapping 704 the plurality of requirements of the domain knowledge to a formal specification.

In some embodiments, method 700 subsequently may also include verifying 706 consistency of the formal specification with domain knowledge. In some embodiments, method 700 subsequently also includes verifying 708 a lack of other problems in the formal specification. One example of other problems is unreachable states in the process defined in the formal specification, although one skilled in the art will understand that yet other problems are contemplated.

In some embodiments, methods 300-700 may be implemented as a communication media, such as a computer data signal embodied in a carrier wave that represents a sequence of instructions which, when executed by a processor, such as the processor 804 in FIG. 8, cause the processor to perform the respective method or as a computer-accessible storage medium having stored executable instructions capable of directing a processor, such as the processor 804 in FIG. 8, to perform the respective method. In varying embodiments, the type of storage medium may be a magnetic medium, an electronic medium, an electromagnetic medium, an optical medium or other mediums that will be readily apparent to one skilled in the art and fall within the scope of this invention.

Hardware and Operating Environment

FIG. 8 is a block diagram of a preferred hardware and operating environment 800 in which different embodiments can be practiced. The description of FIG. 8 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment. Some embodiments can also be at least partially implemented in a quantum mechanical computing and communications environment.

Computer 802 may include a processor 804, commercially available from Intel, Motorola, Cyrix and other manufacturers apparent to one skilled in the art. Computer 802 may also include random-access memory (RAM) 806, read-only memory (ROM) 808, and one or more mass storage devices 810, and a system bus 812, that operatively couples various system components to the processing unit 804. The memory 806 and 808, and mass storage devices, 810, are types of computer-accessible media. Mass storage devices 810 are more specifically types of nonvolatile computer-accessible media and can include one or more hard disk drives, floppy disk drives, optical disk drives, and tape cartridge drives. The processor 804 executes computer programs stored on the computer-accessible media.

Computer 802 can be communicatively connected to the Internet 814 (or any communications network) via a communication device 816. Internet 814 connectivity is well known within the art. In one embodiment, a communication device 816 is a modem that responds to communication drivers to connect to the Internet via what is known in the art as a "dial-up connection." In another embodiment, a communication device 816 is an Ethernet® or similar hardware network card connected to a local-area network (LAN) that itself is connected to the Internet via what is known in the art as a "direct connection" (e.g., T1 line, cable modem, DSL, wireless connection, etc.).

Preferably a user enters commands and information into the computer 802 through input devices such as a keyboard 818 or a pointing device 820. The keyboard 818 permits entry of textual information into the computer 802, as known within the art, and embodiments are not limited to any particular type of keyboard. Pointing device 820 permits the control of the screen pointer provided by a graphical user interface (GUI) of operating systems such as versions of Microsoft Windows®. Embodiments are not limited to any particular pointing device 820. Such pointing devices include mice, touch pads, trackballs, remote controls and point sticks. Other input devices (not shown) can include a microphone, joystick, game pad, gesture-recognition or expression recognition devices, or the like.

In some embodiments, computer 802 is operatively coupled to a display device 822. Display device 822 is connected to the system bus 812. Display device 822 permits the display of information, including computer, video and other information, for viewing by a user of the computer. Embodiments are not limited to any particular display device 822. Such display devices include cathode ray tube (CRT) displays (monitors), as well as flat panel displays such as liquid crystal displays (LCD's) or image and/or text projection systems or even holographic image generation devices. In addition to a monitor, computers typically include other peripheral input/output devices such as printers (not shown). Speakers 824 and 826 (or other audio device) provide audio output of signals. Speakers 824 and 826 are also connected to the system bus 812.

Computer 802 also includes an operating system (not shown) that is stored on the computer-accessible media RAM 806, ROM 808, and mass storage device 810, and is and executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 comprises a PC-compatible computer, a MacOS®-compatible computer, a Linux®-compatible computer, or a UNIX®- compatible computer. The construction and operation of such computers are well known within the art.

Computer 802 can be operated using at least one operating system to provide a graphical user interface (GUI) including a user-controllable pointer. Computer 802 can have at least one web browser application program executing within at least one operating system, to permit users of computer 802 to access an intranet, extranet or Internet world-wide-web pages as addressed by Universal Resource Locator (URL) addresses. Examples of browser application programs include, but are not limited to, Netscape Navigator® and Microsoft Internet Explorer®.

The computer 802 can operate in a networked environment using logical connections to one or more remote computers, such as remote computer 828. These logical connections are achieved by a communication device coupled to, or a part of, the computer 802. Embodiments are not limited to a particular type of communications device. The remote computer 828 can be another computer, a server, a router, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 are connected to the local network 830 through network interfaces or adapters 834, which is one type of communications device 816. Remote computer 828 also includes a network device 836. When used in a conventional WAN-networking environment, the computer 802 and remote computer 828 may communicate with a WAN 832 through modems (not shown) or other devices known in the art. A typical modem, which can be internal or external, may be connected to the system bus 812. In a networked environment, program modules depicted relative to the computer 802, or portions thereof, can be stored in the remote computer 828.

Preferably, the computer 802 also includes power supply 838. Each power supply can be a battery.

CSP Implementation

Figure 10:
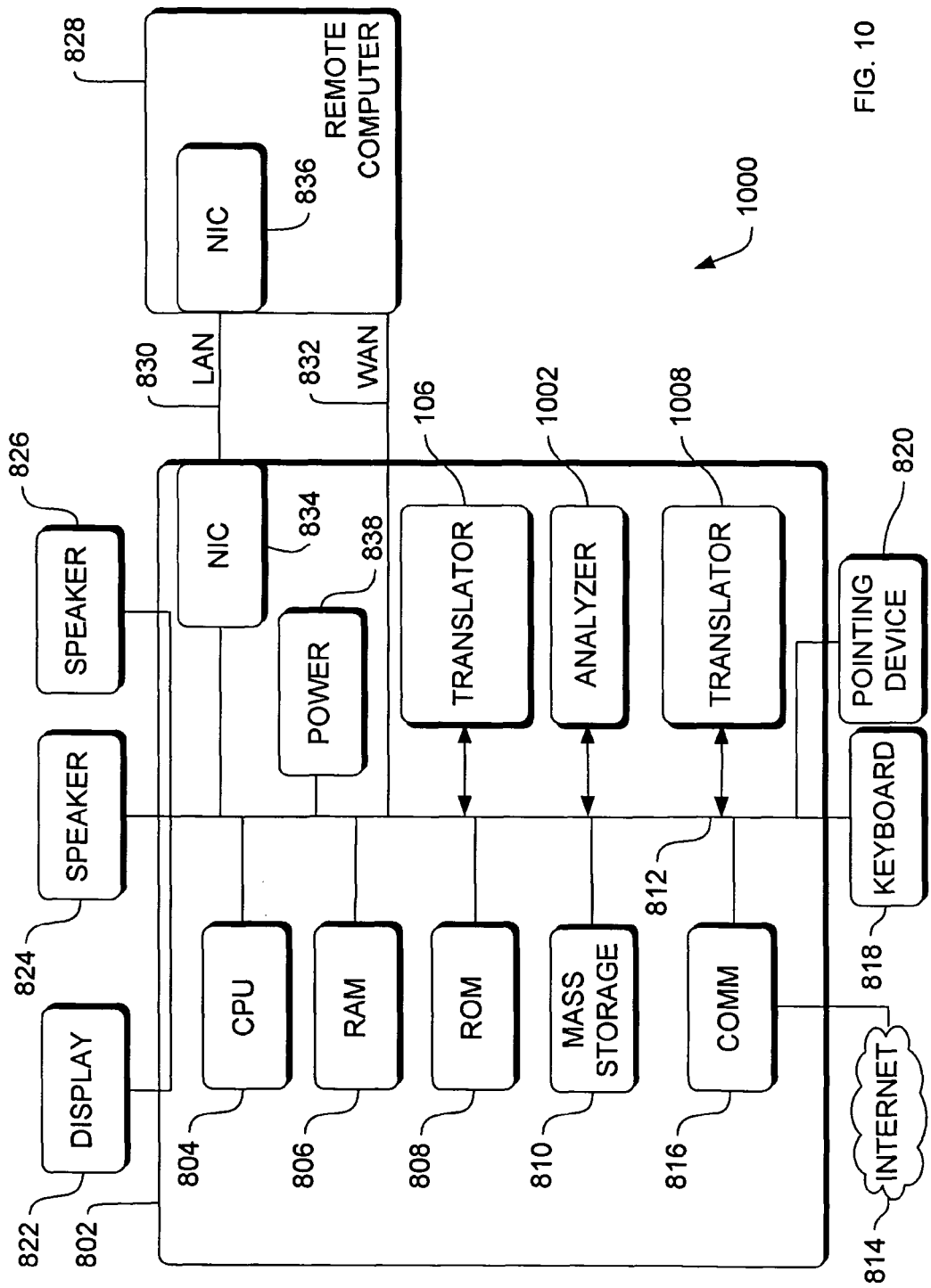
FIG. 10 is a block diagram of a hardware and operating environment in which components of FIG. 9 may be implemented, according to an embodiment.

Referring to FIGS. 9 and 10, a particular CSP implementation 900 is described in conjunction with the system overview in FIG. 1 and the methods described in conjunction with FIG. 2.

FIG. 9 is a block diagram of a particular CSP implementation of an apparatus 900 to analyze a CSP specification generated from rules and/or generate domain knowledge from the rules, according to one embodiment. Apparatus 900 may solve the need in the art for an automated, generally applicable way to verify that implemented rules are a provably correct implementation of a formal specification.

Apparatus 900 may include a CSP translator 106 that generates a CSP specification from the rules 102 in reference to the inference engine 104. The CSP specification 108 is a formal specification 108 that is encoded in CSP.

In some embodiments, the apparatus 900 may include an analyzer 902 to determine various properties such as existence of omissions, deadlock, livelock, and race conditions in the CSP specification 108. Other properties that may be determined are apparent to those skilled in the art. In some embodiments, the analyzer 902 may provide a mathematically sound analysis 904 of the rules 102 in a general format that doesn't require significant understanding of the specific rules of the rules 102. The analyzer 902 can warn developers of errors in their rules 102, such as contradictions and inconsistencies, but equally importantly it can highlight rules or sets of rules that are underspecified or over-specified and need to be corrected for the rules 102 to operate as intended. Thus, in some embodiments, no knowledge of the rules 102 is required, but instead significant analysis, verification, testing, simulation and model checking of the rules 102 using customized tools or existing tools and techniques may be allowed.

In some embodiments, apparatus 900 may include a representation of the laws of concurrency 204 that are received by a translator 908 along with the CSP specification 108. The translator may generate domain knowledge 202 from the laws of concurrency 204 and the CSP specification 108.

The domain knowledge 202 might be expressed in restricted natural language, graphical notations, or even using semi-formal notations such as unified modeling language (UML) use cases. One skilled in the art will know that various languages and notations may be appropriate and fall within the scope of this invention.

In some embodiments, it is notable that the apparatus 900 does not include an automated logic engine to infer the domain knowledge 202 from the CSP specification 108.

Apparatus 900 may be operational for a wide variety of rules 102, domain knowledge languages and applications, and thus apparatus 900 is generally applicable. Such applications may include, without limitation, distributed software systems, sensor networks, robot operation, complex scripts for spacecraft integration and testing, and autonomous systems, but those skilled in the art will understand that other applications are contemplated.

Apparatus 900 components such as the CSP translator 106, the formal specification analyzer 902, and the translator 908 may be embodied as computer hardware circuitry or as a computer-readable program, or a combination of both, such as shown in FIG. 10. FIG. 10 illustrates an environment 1000 similar to that of FIG. 8, with the addition of the CSP translator 106, a formal specification analyzer 1002 and a translator 1008 that correspond to the apparatus 900. In another embodiment, apparatus 900 may be implemented in an application service provider (ASP) system.

More specifically, in the computer-readable program embodiment, the programs may be structured in an object-orientation using an object-oriented language such as Java, Smalltalk or C++, and the programs may be structured in a procedural-orientation using a procedural language such as COBOL or C. The software components communicate in any of a number of ways that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 802 in FIG. 8, or on at least as many computers as there are components.

Conclusion

A validater of a knowledge-based system is described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A computer-accessible storage medium having executable instructions to validate a knowledge-based system, the executable instructions capable of directing a processor to perform:

receiving rules of the knowledge-based system;
   translating the rules of the knowledge-based system to a formal specification, wherein translating comprises a verification process using mathematical laws by which the rules of the knowledge-based system are mapped to the formal specification using a theorem prover or an automated logic engine, wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and
   translating the rules of the knowledge-based system to a formal specification without the use of an automated logic engine, wherein translating comprises a process by which the rules of the knowledge-based system are matched to the formal specification as specified by the prior mapping.

2. The computer-accessible storage medium of claim 1, the medium further comprising executable instructions capable of directing the processor to perform:

analyzing the formal specification, wherein analyzing includes detecting and identifying errors in the formal specification.

3. The computer-accessible storage medium of claim 2, wherein the executable instructions capable of directing the processor to perform analyzing the formal specification further comprises:

applying mathematical logic to the formal specification in order to identify a presence or absence of mathematical properties of the formal specification, wherein mathematical logic operates through the instructions to reveal where the prescribed mathematical properties exist in the formal specification of the scenario.

4. The computer-accessible storage medium of claim 3, wherein the mathematical properties of the formal specification further comprise:

whether the formal specification implies a system execution trace that includes a deadlock condition, wherein a deadlock condition is a condition in which two executing processes each wait for the other to finish; and
   whether the formal specification implies a system execution trace that includes a livelock condition, wherein a livelock condition is a condition in which two executing processes each wait for the other to finish, as their relative internal states change continually during execution without progress being made by either process.

5. The computer-accessible storage medium of claim 1, wherein the rules of the knowledge-based system further comprise:

a plurality of rules encoded in an expert system shell language.

6. The computer-accessible storage medium of claim 1, wherein the expert system shell language further comprises:

the C Language Integrated Production System.

7. The computer-accessible storage medium of claim 1, wherein the rules of the knowledge-based system further comprises:

a plurality of rules encoded in a declarative programming language.

8. The computer-accessible storage medium of claim 7, wherein the declarative programming language further comprises:

the Prolog language.

9. The computer-accessible storage medium of claim 1, wherein the formal specification further comprises:

a formal specification encoded in a sequential process algebra, wherein the sequential process algebra is a member of a diverse family of related approaches to formally modeling concurrent systems that provide a tool for the high-level description of interactions, communications, and synchronizations between a collection of independent agents or processes, along with algebraic laws that allow process descriptions to be manipulated and analyzed, and permit formal reasoning about equivalences between processes.

10. The computer-accessible storage medium of claim 9, wherein the sequential process algebra further comprises:

a language of Communicating Sequential Processes, wherein Communicating Sequential Processes is a formal language for describing patterns of interaction in concurrent systems.

11. The computer-accessible storage medium of claim 1, the medium further comprising executable instructions capable of directing the processor to perform:

translating the formal specification to domain knowledge.

12. The computer-accessible storage medium of claim 1, wherein translating the rules of the knowledge-based system to a formal specification alternatively comprises the use of the theorem prover or automated logic engine.

13. A computer-accessible storage medium having executable instructions to generate a knowledge-based system from domain knowledge, the executable instructions capable of directing a processor to perform:

translating domain knowledge to a formal specification;
    translating the formal specification to rules of the knowledge-based system
    translating comprises a verification process using mathematical laws by which the domain knowledge and formal specification are mapped to the formal specification and the rules of the knowledge-based system respectively, using a theorem prover or an automated logic engine, wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and translating the domain knowledge to a formal specification and translating the formal specification to rules of the knowledge-based system occurs without the use of an automated logic engine, wherein translating comprises a process by which the domain knowledge and formal specification are matched to the formal specification and the rules of the knowledge-based system respectively as specified by the prior mappings.

14. The computer-accessible storage medium of claim 13, wherein the executable instructions capable of directing the processor to perform translating the domain knowledge to the formal specification further comprise:

verifying a syntax of the domain knowledge, wherein verifying the syntax comprises checking that the sequence of data of the domain knowledge complies with the encoded syntax rules; and translating the domain knowledge to a plurality of formal specification segments.

15. The computer-accessible storage medium of claim 13, wherein the executable instructions capable of directing the processor to perform translating the domain knowledge to the formal specification further comprise:

verifying consistency of the formal specification.

16. The computer-accessible storage medium of claim 13, the medium further comprising executable instructions capable of directing the processor to perform:

analyzing the formal specification, wherein analyzing includes detecting and identifying errors in the formal specification.

17. The computer-accessible storage medium of claim 13, the medium further comprising executable instructions capable of directing the processor to perform:

determining mathematical and logical properties of the formal specification using an automated logic engine, wherein the mathematical and logical properties of the formal specification comprise:

whether the formal specification implies a system execution trace that includes a deadlock condition, wherein a deadlock condition is a condition in which two executing processes each wait for the other to finish; and whether the formal specification implies a system execution trace that includes a livelock condition, wherein a livelock condition is a condition in which two executing processes each wait for the other to finish, as their relative internal states change continually during execution without progress being made by either process.

18. The computer-accessible storage medium of claim 13, wherein the rules of the knowledge-based system further comprises:

a plurality of rules encoded in a declarative programming language.

19. The computer-accessible storage medium of claim 18, wherein the declarative programming language further comprises:

the Prolog language.

20. The computer-accessible storage medium of claim 13, wherein the formal specification further comprises:

a sequential process algebra, wherein the sequential process algebra is a member of a diverse family of related approaches to formally modeling (that is, mathematically exact modeling of) concurrent systems that provide a tool for the high-level description of interactions, communications, and synchronizations between a collection of independent agents or processes, along with algebraic laws that allow process descriptions to be manipulated and analyzed, and permit formal (that is, mathematically exact) reasoning about equivalences between processes.

21. The computer-accessible storage medium of claim 20, wherein the sequential process algebra further comprises:

a language of Communicating Sequential Processes, wherein Communicating Sequential Processes is a formal language for describing patterns of interaction in concurrent systems.

22. The computer-accessible storage medium of claim 13, wherein the rules of the knowledge-based system further comprise:

a plurality of rules encoded in an expert system shell language.

23. The computer-accessible storage medium of claim 22, wherein the expert system shell language further comprises:

the C Language Integrated Production System.

24. The computer-accessible storage medium of claim 13, wherein the domain knowledge further comprises:

an informal specification expressed in at least one of a restricted natural language, at least one "if-then" rule, a graphical notation, an English language, a programming language representation, a scenario, a UML use-case, a flowchart, and a semi-formal notation.

25. The computer-accessible storage medium of claim 13, wherein translating the domain knowledge to a formal specification and translating the formal specification to rules of the knowledge-based system alternatively comprises the use of the theorem prover or automated logic engine.

26. A system to validate a software system, the system comprising:

a processor;

an inference engine, wherein an inference engine iteratively applies a set of rules to a set of data representing a problem to determine a solution to the problem by logical manipulation and analysis of the data;

a translator, the translator operable to receive rules of the software system and to generate a specification expressed in Communicating Sequential Processes language, wherein Communicating Sequential Processes is a formal language for describing patterns of interaction in concurrent systems;

the translator performs a verification process comprising using mathematical laws by which the rules of the software system are mapped to the Communicating Sequential Processes specification using a theorem prover or an automated logic engine utilizing the inference engine; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and the translator translates the rules of the software system to the Communicating Sequential Processes specification without the use of an automated logic engine, wherein translating comprises a process by which the rules of the software system are matched to the Communicating Sequential Processes specification as specified by the prior mapping; and an analyzer, the analyzer operable to perform model verification/checking and determine the existence of omissions, deadlock, livelock, and race conditions or other problems and inconsistencies in the Communicating Sequential Processes encoded specification, wherein a deadlock condition is a condition in which two executing processes each wait for the other to finish, wherein a livelock condition is a condition in which two executing processes each wait for the other to finish, as their relative internal states change continually during execution without progress being made by either process, and wherein a race condition is a cause of concurrency problems when multiple processes access a shared resource, with at least one of the accesses being a write, with no mechanism used by any of the processes to moderate simultaneous access to the shared resource.

27. The system of claim 26, wherein the rules of the software system further comprise:
a plurality of rules encoded in the C Language Integrated Production System.

28. The system of claim 26, wherein the rules of the software system further comprise:
a plurality of rules encoded in the Prolog language.

29. A system, the system comprising:
a processor;
a storage device coupled to the processor, the storage device operable to store an expert system, wherein the expert system comprises a set of rules; and
a software apparatus operative on the processor, the software apparatus operable to translate the expert system into a formal specification, the software apparatus comprising:
a translator, the translator operable to receive rules of the expert system and to generate a formal specification;
the translator performs a verification process comprising using mathematical laws by which the rules of the expert system are mapped to the formal specification using a theorem prover or an automated logic engine wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and
the translator translates the rules of the expert system to a formal specification without the use of an automated logic engine, wherein translating comprises a process by which the rules of the software system are matched to the formal specification as specified by the prior mapping; and
an analyzer operable to perform model verification/checking and determine the existence of omissions, deadlock, livelock, and race conditions in the formal specification, wherein a deadlock condition is a condition in which two executing processes each wait for the other to finish, wherein a livelock condition is a condition in which two executing processes each wait for the other to finish, as their relative internal states change continually during execution without progress being made by either process, and wherein a race condition is a cause of concurrency problems when multiple processes access a shared resource, with at least one of the accesses being a write, with no mechanism used by any of the processes to moderate simultaneous access to the shared resource.

30. The system of claim 29, wherein the rules of the software system further comprise:
a plurality of rules encoded in the C Language Integrated Production System.

31. The system of claim 29, wherein the translation of the expert system into a formal specification is carried out without human intervention.

* * * * *